UNITED STATES PATENT OFFICE 2,527,427

STILBENE DISULFONIC ACID DERIVATIVES

Ernst Keller and Reinhard Zweidler, Basel, Switzerland, assignors to J. R. Geigy A. G., Basel, Switzerland, a Swiss company No Drawing. Application July 11, 1949, Serial No. 104,136. In Switzerland July 23, 1948

6 Claims. (Cl. 260—507)

The present invention is concerned with the manufacture of optical brightening agents. By this term is understood colorless, nearly colorless to faintly yellowish compounds which absorb light in the invisible part of the spectrum and emit a bluish-violet to bluish-green fluorescence in the visible range. Because of this fluorescence the optical brightening agents give a white appearance to their more or less colorless carriers. Optical brightening agents which fluoresce a greenish-blue are particularly valuable since they impart an especially pleasing white appearance, whereas those which fluoresce in the violet-blue part of the spectrum give a less suitable reddish appearance which may be displeasing at higher concentrations. The optical brightening agents according to the invention are distinguished by a very intense fluorescence and a particularly pleasant white appearance in the carriers treated.

Stilbene derivatives, particularly derivatives of 4.4'-diamino-stilbene have frequently been suggested as optical brightening agents and have acquired, in part, great practical significance in the optical bleaching of textiles, particularly of textiles based on cellulose. On the other hand, they are less suited for brightening animal fibres, above all because of a too reddish fluorescence.

It has now been found that 4-acylamino-4'-styryl-stilbene-2.2'-disulfonic acids, which may also be termed 1-(4'-acylamino-styryl)-4-styryl-benzene-2.2'-disulfonic acids, having the general formula:

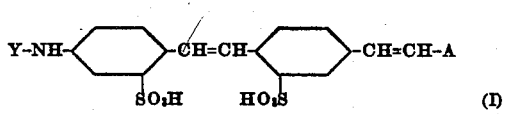

(I)

where Y stands for a colorless carbacyl radical and A stands for a colorless aromatic radical of the benzene series which may also contain substituents usual in simple benzene derivatives, or their alkali salts, are distinguished by a very intense fluorescence in the green-blue part of the spectrum. They are thus excellently suited for brightening more or less colorless carriers or for producing purer shades in the case of light colored textile dyeings.

The new optical brightening agents are obtained by methods known per se, comprising the acylation with suitable derivatives of organic carboxylic acids, of 4-amino-4'-styryl-stilbene-2.2'-disulfonic acids which may also be termed 1-(4'-amino-styryl)-4 - styryl - benzene-2.2'-disulfonic acids and wherein the benzene ring of the 4- or 4'-styryl group may also contain substituents usual in simple benzene derivatives, e. g., halogen, alkyl, alkoxy and sulfonic acid groups, etc. The amino compounds used in the invention are obtained by reduction of the nitro group to the primary amino group in the 4-nitro-4'-styryl-stilbene-2.2'-disulfonic acids, which can be readily prepared as described in copending application Ser. No. 104,135, filed July 11, 1949.

As acylating derivatives of organic carboxylic acids, acid anhydrides and acid halides may be used; for the introduction of aminocarboxylic acid radicals organic isocyanates may also be used. The acylating agents may conveniently be reacted with the aqueous solution of an alkali salt of the amino compound used according to the invention at lower, ordinary or slightly raised temperatures, if desired, in a heterogeneous phase system for adding inert, water-insoluble solvents for the acylating agent, such as benzene, toluene, chlorobenzene, nitrobenzene and so on, or with the addition of water-miscible organic solvents for the acylating agent, which also act as solvent-promoters, e. g., acetone, or again, if required, in the presence of agents weakening or neutralising mineral acids, such as sodium acetate, sodium, magnesium or calcium carbonate, magnesium oxide.

In the following description we term the organic carboxylic acid radicals introduced in this way "carbacyl radicals." We use this expression to make it clear that acyl radicals of other organic acids such as, e. g., those of organic sulfonic, phosphoric or arsinic acids are excluded. It is well known that in the acyl derivatives of 4.4'-diaminostilbene-2.2'-disulfonic acid the nature of the acyl radical has a great influence on the intensity of fluorescense and the shade of the fluorescent light and is, in fact, often decisive in determining practical utility. However, in the case of the carbacyl derivatives of the present invention, this holds to only a very limited extent. For example, 4.4'-di-acetylaminostilbene-2.2'-disulfonic acid is technically valueless because of too low an intensity of fluorencense and a much too reddish shade, whereas the acetyl compounds of 4-amino-4'-styryl-stilbene-2.2'-disulfonic acid according to the present invention have a pure bluish fluorescense of great intensity and are of great technical value. Thus, in principle, the acyl radicals of all colorless organic carboxylic acids may be used as substituents in the optical brightening agents of the present invention. The radicals of lower alkyl-carboxylic acids, of lower phenyl-alkyl and phenoxy-alkyl carboxylic acids, of phenyl-carboxylic acids, of lower alkoxy-carboxylic acids and of phenylamino-carboxylic acids are all of practical importance. The aromatic rings which may be present in the carbacyl group may contain substituents usual in simple benzene derivatives, such as halogen, alkyl, alkoxy, acylamino and sulfonic acid groups, etc. Depending in part on the nature of the carbacyl radical Y, the new optical brightening agents exhibit affinity either for natural or regenerated cellulose fibres or for fibres consisting of keratin or numerous synthetic organic materials including, e. g., casein, superpolyamide and superpolyurethane fibres, as well as for silk and especially for wool. The compounds according to this invention which are most suitable for brightening cellulose fibres are those acylated with the radical of a phenylcarboxylic acid or a phenylamino-carboxylic acid. The degree of affinity for cellulose fibres is such that these compounds can be used in very dilute solution, e. g., in washing and rinsing liquors for textiles. Benzoyl derivatives, in accordance with the present invention, are especially suitable as additives to washing and cleaning agents for the treatment of textiles because, in addition to giving very pure white shades, they do not accumulate on the fibre on repeated treatment of the same textiles, e. g., in domestic laundering. Such undesirable accumulation could finally lead to a dull appearance or even to an unpleasant, e. g., reddish shade, because of the slight self-color of the compounds. Compounds according to the invention which are acylated by the radical of a lower alkyl, alkoxy or phenoxy-alkyl carboxylic acid are suitable for brightening wool, thanks to the good solubility in water of their alkali salts which makes it possible to use them in an acid dyebath. The acetyl and phenoxyacetyl derivatives are particularly useful in this connection.

An obvious pre-requisite for an optical brightening agent which is required to fluoresce blue, is the absence of any pronounced self-color. For this reason no strong chromophores such as, e. g., azo groups, should be present in the compounds of the invention. Possible carriers of such strong chromophores would be the carbacyl radical Y and the radical of the benzene series A. Therefore, to make this requirement clear, we characterize these radicals A and Y as "colorless" i. e. free from chromophores.

The brightening agents according to the present invention surpass optical brightening agents so far known in their intensity of fluorescence. The appropriately acylated derivatives give a previously unattained pure white appearance to chemically prebleached wool and, furthermore, have according to constitution, better fastness towards water, washing and alkalis than known bleaching agents for wool. This is particularly true in comparison with 4.5-diphenyl-imidazole-2-one-disulfonic acid, which is the most important technical optical bleaching agent for wool, although completely different chemically from the compounds of the present invention. The fact that the new optical brightening agents possess an outstandingly intense green-blue fluoresence is surprising, since it might have been supposed that the introduction of a further chromophoric styryl group into the already known stilbene derivatives would displace light-absorption into the visible spectrum, this giving rise to strongly colored compounds.

The carbacyl derivatives of the invention can, according to composition, also be employed as additives to soap. Furthermore, they can also be used admixed with cheaper optical brightening agents which fluoresce blue-violet, such as, e. g., 4.4'-di-(phenylureido)-stilbene-2.2'-disulfonic acid. They are particularly suitable for this because their intense greenish-blue fluorescence tends to improve white shades.

The optical brightening agents according to the invention are, in the form of their alkali salts, more or less yellowish to light yellow powders which give practically colorless solutions in water and can be used in the usual way in washing and rinsing liquors or in dye-baths.

The following examples illustrate the invention without restricting it. Parts are by weight and temperatures in degrees centigrade. The relationship of parts by weight to parts by volume is that of kilograms to litres.

*Example 1*

30 parts of iron filings are mixed with 500 parts of water and 2 parts of concentrated hydrochloric acid. Next, 48.7 parts of 4-nitro-4'-styryl-stilbene-2.2'-disulfonic acid are added, while stirring well, over the course of an hour, at 95–98°. The mixture is maintained at this temperature for a further 3 hours and then made alkaline to phenolphthalein by the addition of about 2.0 parts of soda ash. After filtering hot, the solution is made neutral to litmus with a little concentrated hydrochloric acid, salted out with 20% common salt and the precipitate filtered off and dried. If the crude nitro compound is used, it will usually be found advantageous to add a little hydrosulfite to the hot reducing mixture in order to destroy colored impurities.

After drying, the 4-amino-4'-styryl-stilbene-2.2'-disulfonic acid is a yellowish powder, which gives a faintly yellowish solution in water. The compound dissolves in concentrated sulfuric acid giving a greenish-yellow solution. Dilute aqueous solutions fluoresce greenish in daylight, while in ultraviolet light a very strong green fluorescence is displayed.

The 4-nitro-4'-styryl-stilbene-2.2'-disulfonic acid can, of course, be reduced by other methods suitable for reducing the nitro to the amino group. Thus, instead of iron filings there may be used, for example, alkali sulfides, or hydrosulfites as reducing agents.

*Example 2*

45.7 parts of 4-amino-4'-styryl-stilbene-2.2'-disulfonic acid, prepared according to Example 1, are dissolved in water, with neutral reaction, 17 parts of crystalline sodium acetate are added and the mixture allowed to react at 30–32° with 21 parts of phenoxy-acetyl chloride in 250 parts of benzene while stirring rapidly. After acylation is complete the reaction product is salted out, isolated and dried. When dry, the compound is a pure greenish-yellow colored powder which in dilute aqueous solution has a strong bluish-green fluorescence. The compound draws on to wool out of a weakly acid dyebath, imparting, especially if the wool is chemically prebleached, a pure bluish-white appearance. Thanks to its intense fluorescence very small amounts of the new substance are sufficient to bring about a brightening effect. The dyeing on wool has excellent fastness properties towards washing, water, acid and alkalis as well as good fastness to light. The new compound can also be used for brightening cellulose fibres, silk, schappe and nylon. Special mention is made of the very small amount of the substance necessary for brightening these fibres. The fastness properties of these brightening effects can be designated as good.

*Example 3*

45.7 parts of 4-amino-4'-styryl-stilbene-2.2'-disulfonic acid prepared as in Example 1 are dissolved in water, with neutral reaction. 15 parts of acetic anhydride are then added at 30–32°, while stirring well. After the primary amino groups have disappeared the 4-acetamino-4'-styryl-stilbene-2.2'-disulfonic acid is salted out, filtered off and dried. When dry the compound is a pure greenish-yellow colored powder whose dilute aqueous solution has a strong bluish-green fluorescence. Wool dyed from a weakly acid bath, especially when chemically prebleached, is given a pure bluish-white appearance. The dyeing on wool has excellent fastness properties towards water, washing, acids and alkalis as well as having good fastness to light. The fact that very small amounts of the new compound are sufficient to produce the effect of a very pure white is especially noteworthy. The new substance is also eminently suitable for brightening silk, schappe and nylon. The brightening effect produced by this compound, particularly on wool and silk, has an outstanding pure white appearance.

*Example 4*

45.7 parts of 4-amino-4'-styryl-stilbene-2.2'-disulfonic acid are reacted with a benzene solution of 17 parts of benzoyl chloride in the presence of 17 parts of crystalline sodium acetate. After no more primary amino groups can be detected, the 4-benzoylamino-4'-styryl-stilbene-2.2'-disulfonic acid is salted out of the water-benzene system, filtered off and dried. When dry is is greenish-yellow in appearance. It gives a pure white appearance to cellulose fibres dyed from a neutral bath and to wool or silk dyed from a weakly acid bath. The compound is specially suited for addition to washing agents and soap powders and to rinsing liquors for textiles. Only a very small amount need be added to produce the desired effect.

*Example 5*

45.7 parts of 4-amino-4'-styryl-stilbene-2.2'-disulfonic acid, obtained as in Example 1 are reacted, conveniently in benzene-water solution, with 13 parts of ethyl chloroformate in the presence of 17 parts of crystalline sodium acetate. In the dry state the end product is a greenish-yellow powder which draws from a weakly acid bath on the pre-bleached wool to which it gives a bluish white appearance. Fibres which have been optically bleached in this way have excellent fastness properties towards water, washing, acid and alkali as well as good fastness to light. Cotton and other cellulose fibres in a bath containing Glauber's salt are also given a very intense and pure white appearance with good fastness properties.

If 23 parts of octyl chloroformate are used for the acylation instead of ethyl chloroformate then the product obtained shows similar brightening effects.

*Example 6*

An aqueous solution of 45.7 parts of the disodium salt of 4-amino-4'-styryl-stilbene-2.2'-disulfonic acid which can be prepared as described in Example 1, is reacted with a benzene solution of 17 parts of phenylacetyl chloride, the acyl derivative isolated and dried. The greenish-yellow substance thus obtained is an excellent brightening agent for wool, nylon, silk, cotton and regenerated cellulose. The brightened fibres are a faintly bluish white shade with excellent fastness properties.

A product having similar good properties is obtained when 45.7 parts of 4-amino-4'-styryl-stilbene-2.2'-disulfonic acid are reacted by the method described above with 14 parts of ethoxyacetyl chloride. All these products have the further outstanding feature that very small quantities of them suffice to give an intense brightening effect.

*Example 7*

50.1 parts of 4-nitro-4'-(4''-methyl-styryl)-stilbene-2.2'-disulfonic acid are reduced to 4-amino-4'-(4''-methyl-styryl)-stilbene-2.2'-disulfonic acid by the method described in Example 1.

47.1 parts of this 4-amino-4'-(4''-methyl-styryl)-stilbene-2.2'-disulfonic acid are acetylated in aqueous solution with 16 parts of acetic anhydride, the reaction product is isolated and dried. The product has a greenish-yellow appearance. It is a valuable brightening agent and shows a pure, faintly bluish white shade with good fastness properties on fibres such as wool, nylon, cotton and regenerated cellulose.

A similar product is obtained if the acylation is carried out with, e. g., 24 parts of phenoxyacetyl chloride instead of with acetic anhydride, with the addition of 17 parts of crystalline sodium acetate as buffer. This product also has all the properties of a valuable brightening agent. It may be used for bleaching the most varied kinds of animal and vegetable fibres.

*Example 8*

56.7 parts of 4-nitro-4'-(4''-sulfostyryl)-stilbene-2.2'-disulfonic acid are reduced to 4-amino-4'-(4''-sulfostyryl)-stilbene-2.2'-disulfonic acid by the method described in Example 1.

An aqueous solution of 53.7 parts of the thus obtained 4-amino-4'-(4''-sulfostyryl)-stilbene-2.2'-disulfonic acid is reacted in the presence of a mineral acid binding agent and while stirring well with a benzene solution of benzoyl chloride and the acylation product salted out, separated and dried.

This compound has a greenish-yellow appearance and is a valuable brightening agent which gives a fine white, faintly bluish appearance with very good fastness properties to fibres of the most varied types such as wool, silk, cotton and regenerated cellulose when the latter are treated under suitable conditions with an aqueous solution of the agent.

A series of further compounds with outstanding brightening action, which can be prepared in a manner similar to that described in the examples are listed in the following table.

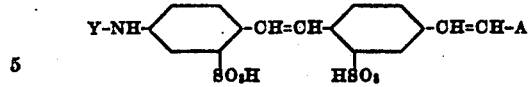

| Example No. | Y | A |
|---|---|---|
| 9 | CH₃-⬡-O-CH₂-CO- | ⬡ |
| 10 | Cl-⬡-O-CH₂-CO- | ⬡ |
| 11 | CH₃-O-⬡-O-CH₂-CO- | ⬡ |
| 12 | ⬡-NH-CO- | ⬡ |
| 13 | CH₃-⬡-NH-CO- | ⬡ |
| 14 | CH₃-⬡-CO- | ⬡ |
| 15 | CH₃-CH₂-CO- | ⬡ |
| 16 | ⬡-CO- | ⬡ |
| 17 | ⬡-O-CH₂-CO- | ⬡-SO₃H |
| 18 | Cl-⬡-O-CH₂-CO- | ⬡-SO₃H |
| 19 | ⬡-NH-CO- | ⬡-SO₃H |
| 20 | ⬡-CO- | ⬡-CH₃ |
| 21 | ⬡-NH-CO- | ⬡-CH₃ |
| 22 | CH₃-CO- | ⬡-O-CH₃ |
| 23 | ⬡-O-CH₂-CO- | ⬡-O-CH₃ |
| 24 | ⬡-CO- | ⬡-O-CH₃ |
| 25 | CH₃-CO- | Cl-⬡ |
| 26 | ⬡-CO- | Cl-⬡ |
| 27 | ⬡-O-CH₂-CO- | Cl-⬡ |
| 28 | ⬡-NH-CO- | Cl-⬡ |
| 29 | CH₃-CO- | Cl-⬡-Cl |

| Example No. | Y | A |
|---|---|---|
| 30 | ⬡—CO— | ⬡ with Cl, Cl |
| 31 | ⬡—O—CH₂—CO— | ⬡ with Cl, Cl |
| 32 | CH₃—CO— | ⬡—NH—CO—CH₃ |
| 33 | ⬡—CO— | ⬡—NH—CO—CH₃ |
| 34 | ⬡—O—CH₂—CO— | ⬡—NH—CO—CH₃ |
| 35 | ⬡—NH—CO— | ⬡—NH—CO—CH₃ |
| 36 | CH₃—CO— | ⬡—O—C₂H₅ |
| 37 | CH₃—CO— | ⬡—NH—CO—CH₃ |
| 38 | CH₃—CO— | ⬡—NH—CO—C₂H₅ |

What we claim is:

As optical brightening agents

1. A compound of the general formula

Y—NH—⬡(SO₃H)—CH=CH—⬡(HSO₃)—CH=CH—A wherein Y represents an acyl radical selected from the group consisting of aliphatic, araliphatic and aromatic carboxylic acid acyl radicals free from chromophores, and A represents an aromatic radical of the benzene series free from chromophores.

2. The compound of the formula

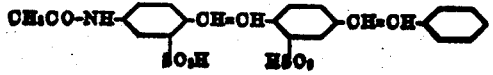

3. The compound of the formula

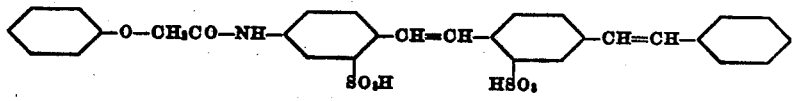

4. The compound of the formula

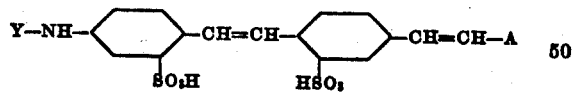

5. The compound of the formula

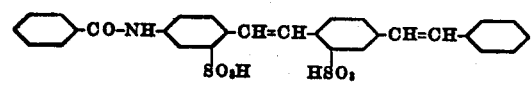

6. The compound of the formula

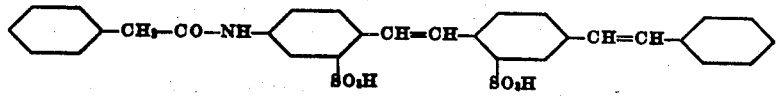

ERNST KELLER.
REINHARD ZWEIDLER.

No references cited.